(12) United States Patent
Abe

(10) Patent No.: US 10,635,090 B2
(45) Date of Patent: Apr. 28, 2020

(54) PROGRAM GENERATING APPARATUS AND PROGRAM GENERATING METHOD

(71) Applicant: FANUC CORPORATION, Yamanashi (JP)

(72) Inventor: Hiroyuki Abe, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/149,308

(22) Filed: Oct. 2, 2018

(65) Prior Publication Data

US 2019/0107826 A1 Apr. 11, 2019

(30) Foreign Application Priority Data

Oct. 5, 2017 (JP) ................................ 2017-194768

(51) Int. Cl.
*G05B 19/00* (2006.01)
*G05B 19/4155* (2006.01)
*G05B 19/4093* (2006.01)

(52) U.S. Cl.
CPC ... *G05B 19/4155* (2013.01); *G05B 19/40937* (2013.01); *G05B 2219/36031* (2013.01);
(Continued)

(58) Field of Classification Search
CPC .......... G05B 19/4155; G05B 19/40937; G05B 2219/36301; G05B 2219/45221;
(Continued)

(56) References Cited

U.S. PATENT DOCUMENTS 5,453,592 A * 9/1995 Takeuchi ................. B23H 7/20
219/69.17
10,300,542 B2 * 5/2019 Miyake .................... B23H 7/02
(Continued)

FOREIGN PATENT DOCUMENTS

CN 1268912 A 10/2000
CN 101224517 A 7/2008
(Continued)

OTHER PUBLICATIONS

Menzies, I., and P. Koshy. "Assessment of abrasion-assisted material removal in wire EDM." CIRP annals 57.1 (2008): 195-198. (Year: 2008).*

(Continued)

*Primary Examiner* — Michael D Masinick
(74) *Attorney, Agent, or Firm* — Robert P. Michal, Esq.; Carter, DeLuca & Farrell LLP

(57) ABSTRACT

A program generating apparatus for generating an NC program for controlling a wire electrical discharge machine includes a machining order acquisition unit configured to acquire order in which a plurality of machining paths should be machined, the order being determined based on a predetermined rule, and a program generating unit configured to automatically change the order acquired by the machining order acquisition unit, so as to perform fixing process for fixing a core, which is produced during machining of a workpiece, to the workpiece by depositing a component of a wire electrode, prior to performing uncut process for leaving part of the core uncut, and generate an NC program for machining the machining paths in the changed order.

8 Claims, 5 Drawing Sheets

(52) U.S. Cl.
CPC .............. *G05B 2219/36301* (2013.01); *G05B 2219/45221* (2013.01)

(58) Field of Classification Search
CPC ........... G05B 2219/36031; G05B 2219/31418; G05B 19/4097
See application file for complete search history.

(56) References Cited

U.S. PATENT DOCUMENTS

| | | | |
|---|---|---|---|
| 2012/0193326 A1 | 8/2012 | Mitsuyasu | |
| 2014/0364992 A1 | 12/2014 | Abe | |
| 2018/0229320 A1* | 8/2018 | Miyake | B23H 7/02 |

FOREIGN PATENT DOCUMENTS

| | | |
|---|---|---|
| EP | 0939356 A2 | 9/1999 |
| JP | S5796724 A | 6/1982 |
| JP | H03245918 A | 11/1991 |
| JP | H11239922 A | 9/1999 |
| JP | 2012-166332 A | 9/2012 |
| JP | 2012166332 A | 9/2012 |
| JP | 5269258 | 5/2013 |
| JP | 2014079876 A | 5/2014 |
| WO | 2013161082 A1 | 10/2013 |

OTHER PUBLICATIONS

Mukherjee, Rajarshi, Shankar Chakraborty, and Suman Samanta. "Selection of wire electrical discharge machining process parameters using non-traditional optimization algorithms." Applied Soft Computing 12.8 (2012): 2506-2516. (Year: 2012).*

Decision to Grant a Patent issued by the Japanese Patent Office in relation to Japanese Application No. 2017-194768 dated Aug. 6, 2019 (3 pages) along with English language translation (2 pages).

* cited by examiner

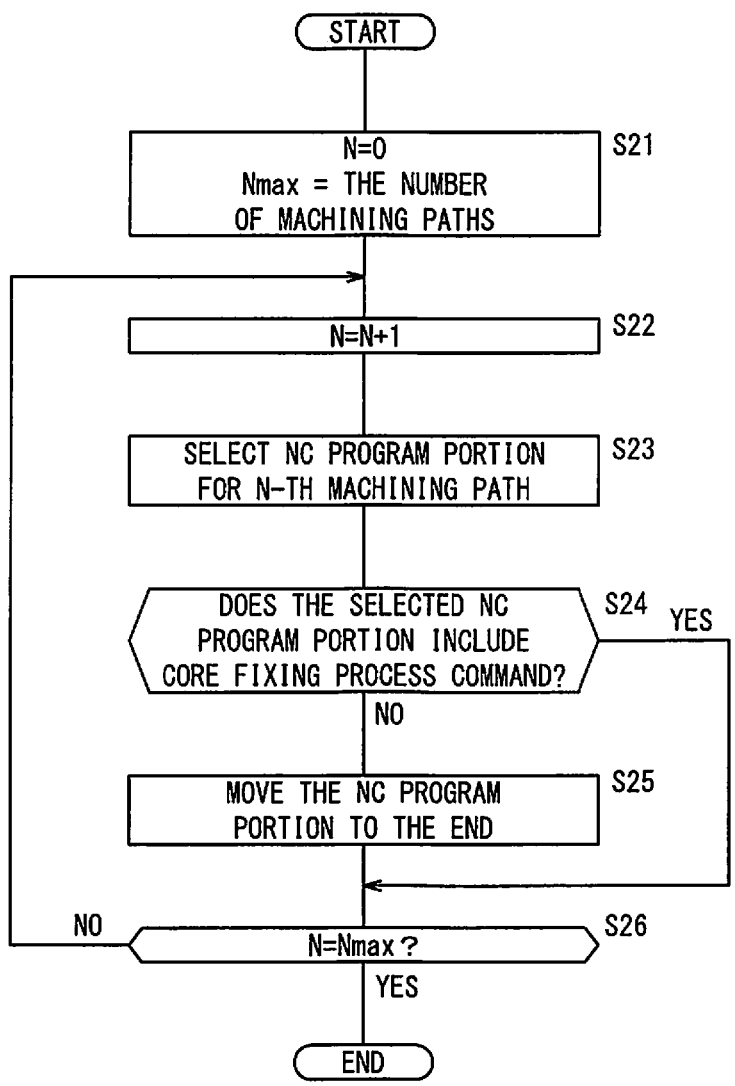

PROGRAM GENERATING APPARATUS AND PROGRAM GENERATING METHOD

CROSS-REFERENCE TO RELATED APPLICATION

This application is based upon and claims the benefit of priority from Japanese Patent Application No. 2017-194768 filed on Oct. 5, 2017, the contents of which are incorporated herein by reference.

BACKGROUND OF THE INVENTION

Field of the Invention

The present invention relates to a program generating apparatus and a program generating method for generating a program for controlling a wire electrical discharge machine.

Description of the Related Art

Japanese Patent No. 5269258 discloses a machining program generating apparatus for generating a machining program which performs control of machining so as to designate a core fixing machining part on a CAM apparatus and perform core fixing machining on the designated core fixing machining part.

SUMMARY OF THE INVENTION

For fixing a core to a workpiece, a fixing process for depositing a component from the wire electrode onto the core and the workpiece in a gap or kerf between them, or an uncut process for leaving part of the core uncut is performed. When the fixed core is removed from the workpiece or when the uncut core is cut off the workpiece, the operator has to perform a core removal process. When a machining process on a workpiece involves both the fixing process and the uncut process, problems tend to occur that the operator has to perform removal of cores an increased number of times, depending on the order the cores are machined.

The present invention has been devised to solve the above problem, it is therefore an object of the present invention to provide a program generating apparatus and a program generating method capable of generating a program which can reduce the number of times the operator performs core removal process during machining accompanied by producing of cores in a wire electrical discharge machine.

A first aspect of the present invention resides in a program generating apparatus for generating a numerical control (NC) program for controlling a wire electrical discharge machine, including: a machining order acquisition unit configured to acquire order in which a plurality of machining paths should be machined, the order being determined based on a predetermined rule; and a program generating unit configured to automatically change the order acquired by the machining order acquisition unit, so as to perform fixing process for fixing a core, which is produced during machining of a workpiece, to the workpiece by depositing a component of a wire electrode, prior to performing uncut process for leaving part of the core uncut, and generate an NC program for machining the machining paths in the changed order.

A second aspect of the present invention resides in a program generating method for generating an NC program for controlling a wire electrical discharge machine, the method including: a machining order acquisition step of acquiring order in which a plurality of machining paths should be machined, the order being determined based on a predetermined rule; and a program generating step of automatically changing the order acquired in the machining order acquisition unit, so as to perform fixing process for fixing a core, which is produced during machining of a workpiece, to the workpiece by depositing a component of a wire electrode, prior to performing uncut process for leaving part of the core uncut, and generate an NC program for machining the machining paths in the changed order.

According to the present invention, it is possible to generate a program which is capable of reducing the number of times the operator performs core removing work.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flowchart showing a flow of a program generating process executed in a program generating unit.

DESCRIPTION OF THE PREFERRED EMBODIMENTS

[First Embodiment]
[Configuration of Program Generating Apparatus]

Figure 1:
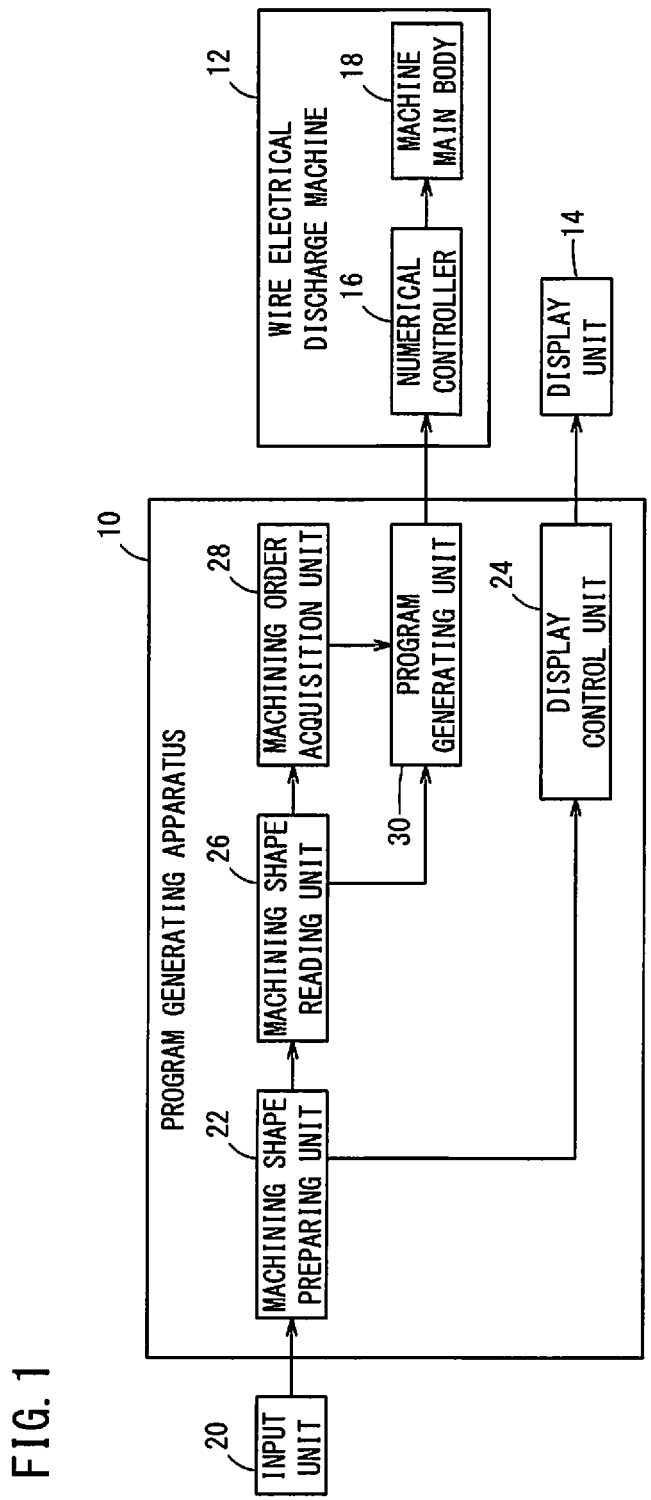
FIG. 1 is a block diagram showing a program generating apparatus and a wire electrical discharge machine.
Figure 2:
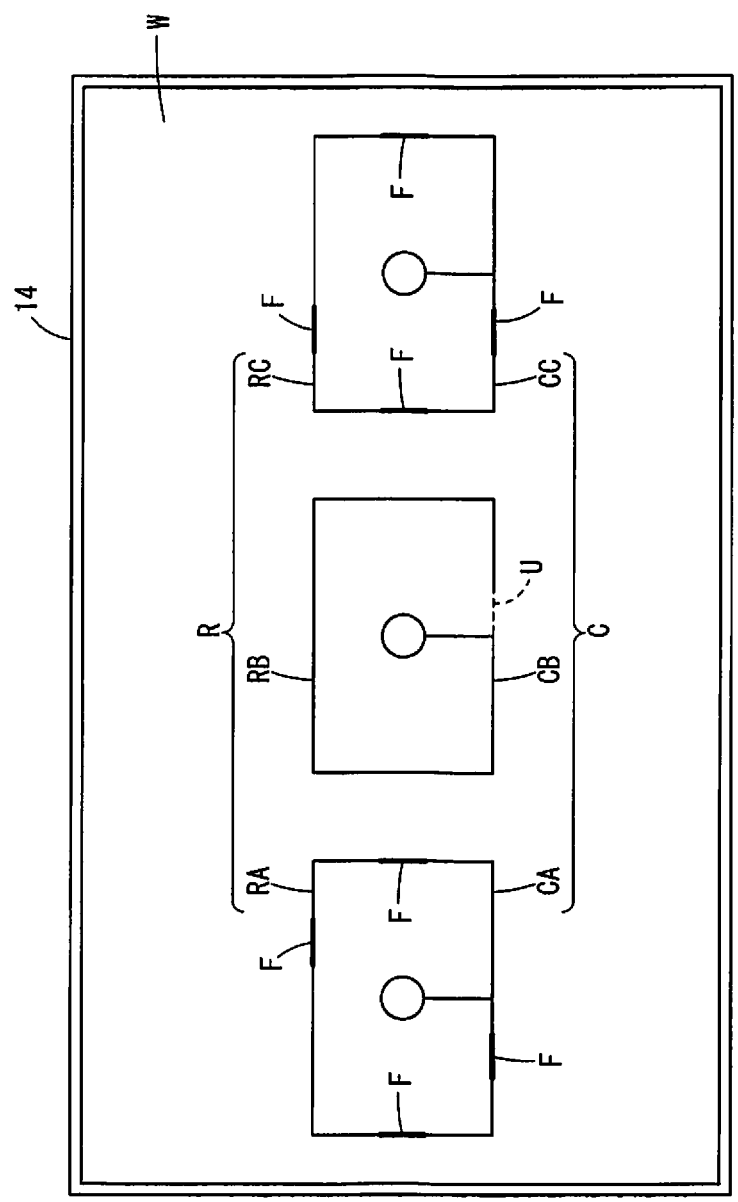
FIG. 2 is a diagram showing an example of machining paths and cores in a workpiece displayed on a display unit.

FIG. 1 is a block diagram showing a program generating apparatus 10 and a wire electrical discharge machine 12. FIG. 2 is a diagram showing an example of machining paths R and cores C in a workpiece W displayed on a display unit 14. In the example of FIG. 2, the workpiece W has machining paths RA, RB and RC for defining a machining shape. When rough machining is performed on the workpiece W, cores CA, CB and CC are produced.

Hereinbelow, as shown in FIG. 2, a machining path R indicates a single continuous line on a plane of the workpiece W, and a route drawn by such a single continuous line is counted as one machining path R. Therefore, the workpiece W shown in FIG. 2 contains three machining paths RA, RB, RC. In the following description, the person who performs operation or the like of the program generating apparatus 10 is referred to as a user, while the person who performs operation or the like of the wire electrical discharge machine 12 is referred to as an operator.

When a core C is produced during rough machining of a machining path R, the wire electrical discharge machine 12 performs fixing process for fixing the core C to the workpiece W by depositing a component of the wire electrode (not shown) onto the core C and the workpiece W in a gap or kerf between the core C and the workpiece W, or performs uncut process for leaving a part of the machining path between the core C and the workpiece W uncut.

In the case of performing the fixing process, the operator has to perform a removal work of tapping (or applying an impact to) the core C to thereby separate the core C from the workpiece W and remove the separated core C. On the other hand, in the case of performing the uncut process, the operator has to cause the wire electrical discharge machine 12 to perform a cutting-off process of cutting off the uncut portion and remove the separated core C. The wire electrical discharge machine 12 performs a finishing process after removal of the core C produced during rough machining.

The fixed core C can be removed from the workpiece W by applying an impact by the operator. On the other hand, it is necessary to cut off the core C, which has been subjected to the uncut process, by cutting the uncut portion by the wire electrical discharge machine 12. Accordingly, use of the core fixing process is better in terms of work efficiency. However, in a case that the core C has a complicated shape, that the taper angle of the core C is large, or that the core C is relatively large, it is difficult or impossible to apply the fixing process to the core C, so that such cases involve the uncut process.

The program generating apparatus 10 is, for example, a personal computer or the like equipped with CAD/CAM software. The program generating apparatus 10 generates a numerical control (NC) program for controlling the wire electrical discharge machine 12 according to machining paths R on the workpiece W, which are input by the user. In the program generating apparatus 10, the generated NC program is sent to a numerical controller 16 of the wire electrical discharge machine 12. The numerical controller 16 runs the NC program to compute command values for various devices of a machine main body 18. The command values are sent from the numerical controller 16 to various devices of the machine main body 18. Based on the command values, various devices operate to machine the workpiece W.

An input unit 20 and a display unit 14 are connected to the program generating apparatus 10. The input unit 20 includes, for example, a keyboard, a mouse, and the like. The user operates the input unit 20 to thereby perform input of characters, symbols, numerals, etc., designation of a position on the display unit 14, selection of an icon or the like displayed on the display unit 14, and other operations. The display unit 14 is, for example, a liquid crystal display or the like. On the display unit 14, characters, symbols, numerals, images, etc., can be displayed.

The program generating apparatus 10 includes a machining shape preparing unit 22, a display control unit 24, a machining shape reading unit 26, a machining order acquisition unit 28 and a program generating unit 30. The machining shape preparing unit 22 sets routes designated by the user operating the input unit 20 as machining paths R, and prepares a machining shape of the workpiece W according to the machining paths R. The display control unit 24 controls the display unit 14 so as to display the machining shape of the workpiece W created by the machining shape preparing unit 22.

Further, the machining shape preparing unit 22 sets core fixing points F at which cores C are fixed to the workpiece W by depositing a composition from the unillustrated wire electrode onto portions between the workpiece W and the cores C, to points designated by the user operating the input unit 20, on the machining paths R. The display control unit 24 controls the display unit 14 so as to display the set core fixing points F.

Furthermore, the machining shape preparing unit 22 sets core uncut points U at which cores C are fixed to the workpiece W by leaving portions between the workpiece W and the cores C uncut, to points designated by the user operating the input unit 20, on the machining paths R. The display control unit 24 controls the display unit 14 so as to display the set core fixing points F and core uncut points U.

The machining shape reading unit 26 reads the machining paths R, the core fixing points F, and the core uncut points U set by the machining shape preparing unit 22. The machining order acquisition unit 28 acquires the order in which the machining paths R should be machined (machining order or order of machining), from the machining paths R read by the machining shape reading unit 26. The machining order acquisition unit 28 acquires the order of machining in accordance with a predetermined rule. For example, in a case where the machining paths R are defined based on coordinates on the X-axis and the Y-axis, the predetermined rule for determining the order of machining may be configured so that a machining path R whose machining start point on the workpiece W is the closest to the origin on the XY-coordinate plane is machined first, and a machining path R is machined later as the start point of the machining path R is more distant from the origin on the XY-coordinate plane. The rule is not limited to the example given herein. When the machining shape of the workpiece W shown in FIG. 2 is read, the machining order acquisition unit 28 acquires the order in which the machining paths R should be machined as follows:

(1) Rough machining of the machining path RA (including fixing process);
(2) Rough machining of the machining path RB (including uncut and cut-off processes);
(3) Rough machining of the machining path RC (including fixing process);
(4) Finishing of the machining path RA;
(5) Finishing of the machining path RB; and
(6) Finishing of the machining path RC.

The program generating unit 30 generates an NC program for controlling the wire electrical discharge machine 12 based on the machining paths R, the core fixing points F, and the core uncut points U read by the machining shape reading unit 26. The program generating unit 30 generates an NC program so as to machine the workpiece along the machining paths R in the machining order acquired by the machining order acquisition unit 28. In this regard, however, when machining of the machining paths R contains both the fixing process and the uncut process, the program generating unit 30 generates an NC program by partially changing the order in which the machining paths R should be machined.

[Program Generating Process]

Figure 3:
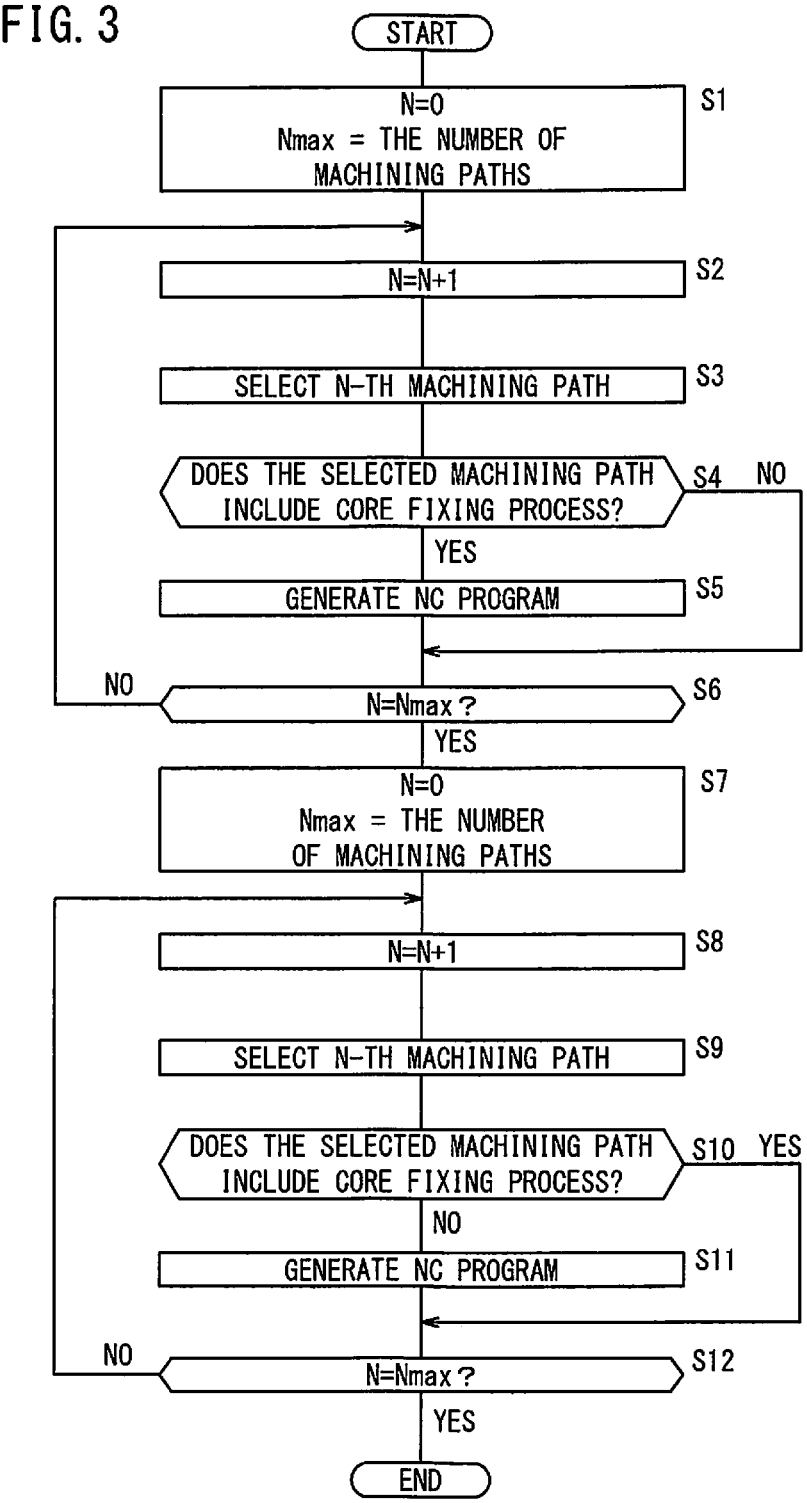
FIG. 3 is a flowchart showing a flow of a program generating process executed in a program generating unit.

FIG. 3 is a flowchart showing the flow of a program generating process performed in the program generating unit 30.

At step S1, a count value N is set to 0, and the maximum value Nmax is set to the number of the machining paths R. Then, the control goes to step S2. In the example of FIG. 2, the maximum value Nmax is set at 3.

At step S2, the count value N is incremented, and the control goes to step S3. At step S3, the program generating unit 30 selects a machining path R that has the N-th in the machining order acquired by the machining order acquisition unit 28, and the control proceeds to step S4.

At step S4, the program generating unit 30 determines whether or not the machining path R selected at step S3 includes core fixing process. If the selected machining path R includes core fixing process, the control goes to step S5. When the selected machining path R includes no core fixing process, the control goes to step S6. At step S5, the program generating unit 30 generates an NC program for the machining path R selected at step S3, and then the control proceeds to step S6.

At step S6, it is determined whether or not the count value N is the maximum value Nmax. If the count value N is the maximum value Nmax, the control goes to step S7, and if the count value N is not the maximum value Nmax, the control returns to step S2.

At step S7, the count value N is set to 0, and the maximum value Nmax is set to the number of the machining paths R, and the control goes to step S8. At step S8, the count value N is incremented, and the control goes to step S9. At step S9, the program generating unit 30 selects a machining path R that has the N-th in the machining order acquired by the machining order acquisition unit 28, and the control proceeds to step S10.

At step S10, the program generating unit 30 determines whether or not the machining path R selected at step S9 include core fixing process. If the selected machining path R includes core fixing process, the control goes to step S12. When the selected machining path R includes no core fixing process, the control goes to step S11. At step S11, the program generating unit 30 generates an NC program for the machining path R selected at step S9, and then the control proceeds to step S12.

At step S12, it is determined whether or not the count value N is the maximum value Nmax. If the count value N is the maximum value Nmax, this control is terminated. If the count value N is not the maximum value Nmax, the control returns to step S8.

[Change of Machining Order]

The program generating unit 30 changes the machining order of the machining paths R acquired by the machining order acquisition unit 28 so as to generate an NC program which performs machining in the following order:
(1) Rough machining of the machining path RA (including fixing process);
(2) Rough machining of the machining path RC (including fixing process)
(3) Rough machining of the machining path RB (including uncut and cut-off processes);
(4) Finishing of the machining path RA;
(5) Finishing of the machining path RB; and
(6) Finishing of the machining path RC.

The program generating unit 30 generates an NC program so as to perform machining including fixing process earlier, that is, perform "the rough machining of the machining path RA" and "the rough machining of the machining path RC" including fixing process prior to performing "the rough machining of the machining path RB" including uncut and cut-off processes.

[Operation and Effect]

Concerning the cores C that have been subjected to fixing process, after the rough machining on all the machining paths R by the wire electrical discharge machine 12 is completed, operation of the wire electrical discharge machine 12 is stopped, and then the operator can separate the cores C from the workpiece W and remove them. On the other hand, concerning the cores C that have been subjected to uncut process, every time one of the cores C is separated by cutting the uncut portion by the wire electrical discharge machine 12, the operator has to stop the wire electrical discharge machine 12 and remove the separated core C.

When the stoppage of the wire electrical discharge machine 12 and the operator's work are added to the order of machining acquired by the machining order acquisition unit 28, the resulting working sequence is as follows:
(1) Rough machining of the machining path RA (including fixing process);
(2) Rough machining of the machining path RB (including uncut and cut-off processes);
(2-1) Stopping the wire electrical discharge machine 12;
(2-2) Separating of the core CA and removal of cores CA and CB;
(3) Rough machining of the machining path RC (including fixing process);
(3-1) Stopping the wire electrical discharge machine 12;
(3-2) Separating of the core CC and removal of the core CC;
(4) Finishing of the machining path RA;
(5) Finishing of the machining path RB; and
(6) Finishing of the machining path RC.

As described above, in the order of machining acquired by the machining order acquisition unit 28, it is necessary to stop operation of the wire electrical discharge machine 12 two times and perform operator's removing work of core C two times. In order to reduce the number of times the wire electrical discharge machine 12 is stopped and the number of times the operator performs removing work of core C, the order of machining may be changed as follows.
(1) Rough machining of the machining path RA (including fixing process);
(2) Rough machining of the machining path RC (including fixing process);
(3) Rough machining of the machining path RB (including uncut and cut-off processes);
(3-1) Stopping the wire electrical discharge machine 12;
(3-2) Separating of cores CA and CC and removal of cores CA, CB and CC;
(4) Finishing of the machining path RA;
(5) Finishing of the machining path RB; and
(6) Finishing of the machining path RC.

Thus, the number of times operation of the wire electrical discharge machine 12 is stopped can be reduced to one time, and the number of times the operator performs removal work of cores C can be reduced to one time. In the program generating apparatus 10, the order of machining acquired by the machining order acquisition unit 28 can be changed by the user operating the input unit 20. However, as the number of machining paths R increases, the number of changes in the machining order becomes enormous, and consequently it is difficult for the user to change the order by operating the input unit 20.

To deal with this, in the present embodiment, the program generating unit 30 is configured to generate an NC program for controlling the wire electrical discharge machine 12 by changing the machining order acquired by the machining order acquisition unit 28 so as to perform fixing process prior to performing uncut process, so that the workpiece is machined along the machining paths R in the modified order. As a result, it is possible to generate an NC program that can reduce the number of times of operator's removal work of cores C, without the need for the user to operate the input unit 20 for changing the machining order.

Further, in the present embodiment, the program generating apparatus 10 is configured to generate an NC program based on the machining paths R of the workpiece W read by the machining shape reading unit 26. This makes it possible to automatically generate an NC program capable of reducing the number of times of operator's removal work of cores C, based on the machining paths R of the workpiece W input by the user through the input unit 20.

[Second Embodiment]

Figure 4:
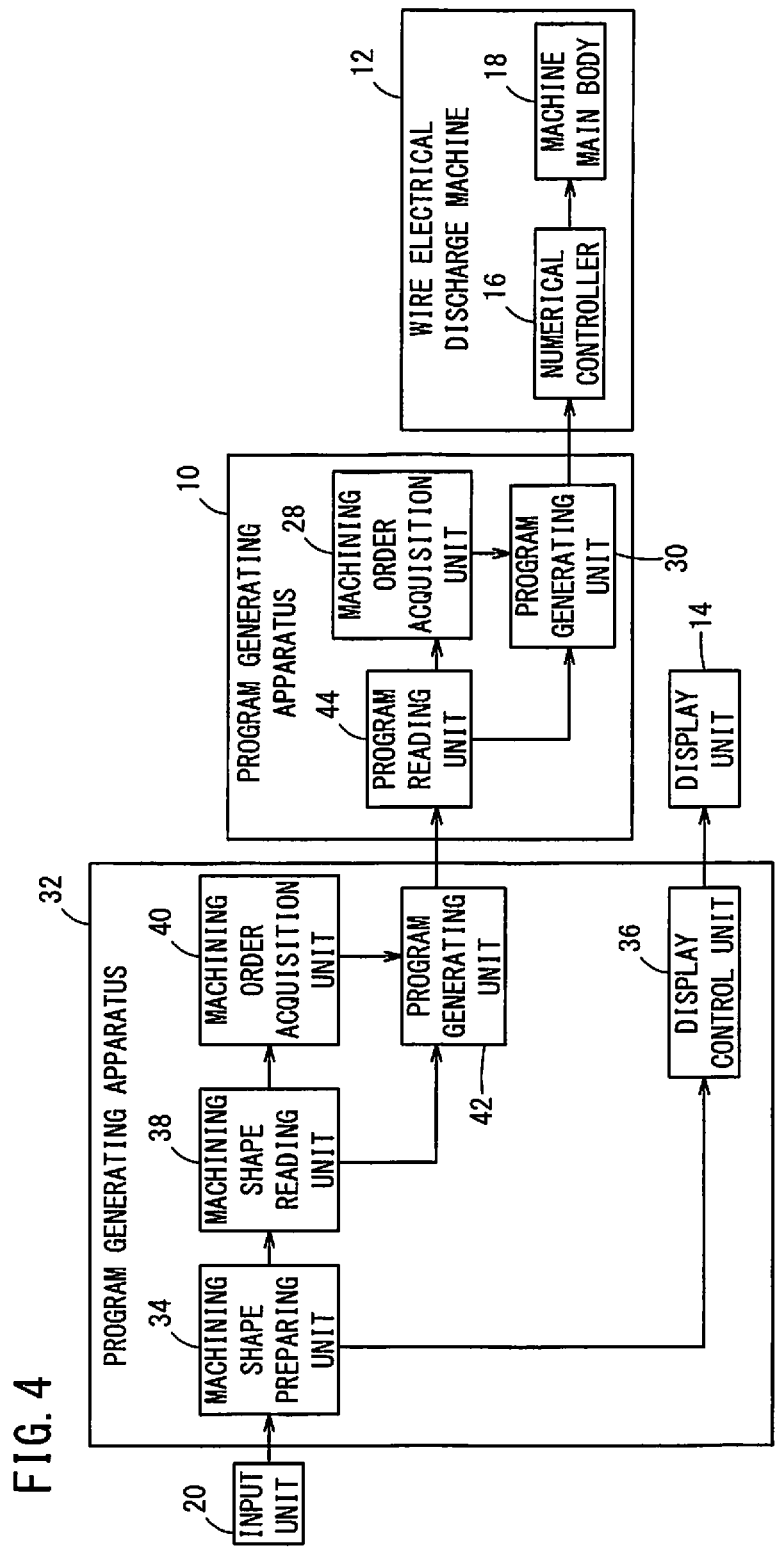
FIG. 4 is a block diagram showing a program generating apparatus and a wire electrical discharge machine.

FIG. 4 is a block diagram showing a program generating apparatus 32, a program generating apparatus 10, and a wire electrical discharge machine 12.

The program generating apparatus 32 is, for example, a personal computer or the like equipped with CAD/CAM software. The program generating apparatus 32 generates an NC program for controlling the wire electrical discharge machine 12 according to machining paths R on the workpiece W, which are input by the user.

The program generating apparatus 10 is a personal computer or the like equipped with CAD/CAM software. The program generating apparatus 10 reads an NC program generated by the program generating apparatus 32, and modifies the NC program. The program generating apparatus 32 and the program generating apparatus 10 may be personal computers or the like on which the same application is installed. For example, the program generating apparatus 32 may be used in an office by a user in charge of programming while the program generating apparatus 10 may be used by an operator who operates the wire electrical discharge machine 12, in a factory where the wire electrical discharge machine 12 is installed. In the following description, both a person operating the program generating apparatus 32 and a person operating the program generating apparatus 10 will be referred to as a user.

The program generating apparatus 32 includes a machining shape preparing unit 34, a display control unit 36, a machining shape reading unit 38, a machining order acquisition unit 40, and a program generating unit 42. The machining shape preparing unit 34 sets routes designated by the user operating the input unit 20 as machining paths R, and prepares a machining shape of the workpiece W according to the machining paths R. The display control unit 36 controls the display unit 14 so as to display the machining shape of the workpiece W created by the machining shape preparing unit 34.

Further, the machining shape preparing unit 34 sets core fixing points F at which cores C are fixed to the workpiece W by depositing a composition from the unillustrated wire electrode onto portions between the workpiece W and the cores C, to points designated, on the machining paths R, by the user operating the input unit 20. The display control unit 36 controls the display unit 14 so as to display the set core fixing points F.

Furthermore, the machining shape preparing unit 34 sets core uncut points U at which cores C are fixed to the workpiece W by leaving portions between the workpiece W and the cores C uncut, to points designated, on the machining paths R, by the user operating the input unit 20. The display control unit 36 controls the display unit 14 so as to display the set core fixing points F and core uncut points U.

The machining shape reading unit 38 reads the machining paths R, the core fixing points F, and the core uncut points U set by the machining shape preparing unit 34. The machining order acquisition unit 40 acquires the machining order from the machining paths R on the workpiece W read by the machining shape reading unit 38. When, for example, the machining paths R shown in FIG. 2 are read, the machining order acquisition unit 40 acquires the machining order as follows:
(1) Rough machining of the machining path RA (including fixing process);
(2) Rough machining of the machining path RB (including uncut and cut-off processes);
(3) Rough machining of the machining path RC (including fixing process);
(4) Finishing of the machining path RA;
(5) Finishing of the machining path RB; and
(6) Finishing of the machining path RC.

The program generating unit 42 generates an NC program for controlling the wire electrical discharge machine 12 based on the machining paths R, the core fixing points F, and the core uncut points U, read by the machining shape reading unit 38. The program generating unit 42 generates an NC program so as to machine the workpiece along the machining paths R in the machining order acquired by the machining order acquisition unit 40.

The program generating apparatus 10 includes a program reading unit 44, a machining order acquisition unit 28, and a program generating unit 30. The program reading unit 44 reads the NC program generated by the program generating apparatus 32.

The machining order acquisition unit 28 acquires the machining order from the NC program read by the program reading unit 44. When, in the NC program read by the program reading unit 44, machining of the machining paths R contains both the fixing process and the uncut process, the program generating unit 30 modifies the NC program by partially changing the order in which the machining paths R should be machined.

[Program Generating Process]

FIG. 5 is a flowchart showing a flow of a program generating process performed in the program generating unit 30 of the program generating apparatus 10.

At step S21, the count value N is set to 0, the maximum value Nmax is set to the number of the machining paths R, and the control goes to step S22. At step S22, the count value N is incremented, and the control goes to step S23. At step S23, the program generating unit 30 selects a portion of the NC program for a machining path R that has the N-th in the machining order acquired by the machining order acquisition unit 28, and the control goes to step S24.

At step S24, the program generating unit 30 determines whether or not the portion of the NC program for the machining path R selected at step S23 includes a core fixing process command. When the portion of the NC program for the selected machining path R includes a core fixing process command, the control goes to step S26. If the portion of the NC program for the selected machining path R does not include a core fixing process command, the control proceeds to step S25.

At step S25, the program generating unit 30 moves the portion of the NC program for the machining path R selected at step S23 to the end of the NC program, and then the control proceeds to step S26. At step S26, it is determined whether or not the count value N is the maximum value Nmax. If the count value N is the maximum value Nmax, the control is terminated. If the count value N is not the maximum value Nmax, the control returns to step S22.

[Change of Machining Order]

The program generating unit 30 changes the machining order acquired by the machining order acquisition unit 28 to thereby change the NC program which performs machining in the following order:
(1) Rough machining of the machining path RA (including fixing process);
(2) Rough machining of the machining path RC (including fixing process)
(3) Rough machining of the machining path RB (including uncut and cut-off processes);
(4) Finishing of the machining path RA;
(5) Finishing of the machining path RB; and
(6) Finishing of the machining path RC.

In the machining order of the machining paths R in the modified NC program, "the rough machining of the machining path RA" and "the rough machining of the machining path RC" including core fixing process are performed, prior to performing "the rough machining of the path RB" including uncut and cut-off processes.

[Operation and Effect]

In this embodiment, the program generating apparatus 10 reads an NC program generated by the program generating apparatus 32, and changes the NC program so that machining with core fixing process is performed prior to machining with uncut process. As a result, the program generating apparatus 10 can change the read NC program to an NC program that can reduce the number of times of operator's removal work of cores C.

[Technical Concept Obtained from the Embodiment]

Technical concepts that can be grasped from the above embodiment will be described below.

The program generating apparatus (10) for generating the NC program for controlling the wire electrical discharge machine (12), includes: the machining order acquisition unit (28) configured to acquire the order in which a plurality of machining paths (R) should be machined, the order being determined based on a predetermined rule; and the program generating unit (30) configured to automatically change the order acquired by the machining order acquisition unit (28), so as to perform fixing process for fixing a core (C), which is produced during machining of the workpiece (W), to the workpiece (W) by depositing a component of the wire electrode, prior to performing uncut process for leaving part of the core (C) uncut, and generate the NC program for machining the machining paths (R) in the changed order. As a result, it is possible to generate a program that can reduce the number of times of operator's removal work of cores (C) without requiring the user to change the machining order by operating the input unit (20).

The above program generating apparatus (10) may further include: the machining shape reading unit (26) configured to read the machining paths (R) input by the user operating the input unit (20). In this configuration, the machining order acquisition unit (28) is configured to acquire the order in which the machining paths (R) should be machined, from the machining paths (R) read by the machining shape reading unit (26), and the program generating unit (30) is configured to generate the NC program, based on the machining paths (R) read by the machining shape reading unit (26), so as to machine the machining paths (R) in the changed order. With this configuration, it is possible to automatically generate an NC program that can reduce the number of times of operator's removal work of cores (C), in accordance with the machining paths (R) on the workpiece (W) input by the user operating the input unit (20).

The above program generating apparatus (10) may further include the program reading unit (44) configured to read an NC program. In this configuration, the machining order acquisition unit (28) is configured to acquire the order in which the machining paths (R) should be machined, from the NC program read by the program reading unit (44), and the program generating unit (30) is configured to change the NC program read by the program reading unit (44), so as to machine the machining paths (R) in the changed order. This program generating apparatus (10) makes it possible to change a read NC program into an NC program which can reduce the number of times of operator's removal work of cores (C).

The program generating method for generating the NC program for controlling the wire electrical discharge machine (12), includes: a machining order acquisition step of acquiring the order in which a plurality of machining paths (R) should be machined, the order being determined based on a predetermined rule; and a program generating step of automatically changing the order acquired in the machining order acquisition step, so as to perform fixing process for fixing a core (C), which is produced during machining of the workpiece (W), to the workpiece (W) by depositing a component of the wire electrode, prior to performing uncut process for leaving part of the core (C) uncut, and generate an NC program for machining the machining paths (R) in the changed order. As a result, it is possible to generate a program that can reduce the number of times of operator's removal work of cores (C) without requiring the user to change the machining order by operating the input unit (20).

The above program generating method may further include a machining shape reading step of reading the machining paths (R) input by the user operating the input unit (20). In this method, the machining order acquiring step acquires the order in which the machining paths (R) should be machined, from the machining paths (R) read in the machining shape reading step, and the program generating step generates the NC program, based on the machining paths (R) read in the machining shape reading step, so as to machine the machining paths (R) in the changed order. With this configuration, it is possible to automatically generate an NC program that can reduce the number of times of operator's removal work of cores (C), in accordance with the machining paths (R) on the workpiece (W) input by the user operating the input unit (20).

The above program generating method may further include a program reading step of reading an NC program. In this method, the machining order acquisition step acquires the order in which the machining paths (R) should be machined, from the NC program read in the program reading step, and the program generating step changes the NC program read in the program reading step, so as to machine the machining paths (R) in the changed order. This method makes it possible to change a read NC program into an NC program which can reduce the number of times of operator's removal work of cores (C).

The present invention is not particularly limited to the embodiments described above, and various modifications are possible without departing from the essence and gist of the present invention.

What is claimed is:

1. A program generating apparatus for generating a numerical control program for controlling a wire electrical discharge machine, comprising:
   a machining order acquisition unit configured to acquire order in which a plurality of machining paths should be machined, the order being determined based on a predetermined rule; and
   a program generating unit configured to automatically change the order acquired by the machining order acquisition unit so as to perform an attaching process for attaching a core to a workpiece by depositing a component of a wire electrode, and generate a numerical control program configured to machine the machining paths in the changed order, wherein:
   the core is produced during the machining of the workpiece; and
   wherein the depositing the component of the wire electrode is done prior to performing an uncut process for leaving part of the core uncut.

2. The program generating apparatus according to claim 1, further comprising a machining shape reading unit configured to read the machining paths input by a user operating an input unit, wherein:
   the machining order acquisition unit is configured to acquire the order in which the machining paths should be machined, from the machining paths read by the machining shape reading unit; and the program generating unit is configured to generate the numerical control program, based on the machining paths read by the machining shape reading unit, so as to machine the machining paths in the changed order.

3. The program generating apparatus according to claim 1, further comprising a program reading unit configured to read a numerical control program; wherein:

the machining order acquisition unit is configured to acquire the order in which the machining paths should be machined, from the numerical control program read by the program reading unit; and the program generating unit is configured to change the numerical control program read by the program reading unit, so as to machine the machining paths in the changed order.

4. The program generating apparatus according to claim 1, wherein performing the uncut process for leaving part of the core uncut includes a partial cutting of another core from the workpiece such that the another core remains attached to the remaining portion of the workpiece via an uncut portion of the another core.

5. A program generating method for generating a numerical control program for controlling a wire electrical discharge machine, the method comprising:

a machining order acquisition step of acquiring order in which a plurality of machining paths should be machined, the order being determined based on a predetermined rule; and a program generating step of automatically changing the order acquired in the machining order acquisition step so as to perform an attaching process for attaching a core to a workpiece by depositing a component of a wire electrode, and generate a numerical control program configured to machine the machining paths in the changed order, wherein:

the core is produced during the machining of the workpiece; and wherein the depositing the component of the wire electrode is done prior to performing an uncut process for leaving part of the core uncut.

6. The program generating method according to claim 5, further comprising a machining shape reading step of reading the machining paths input by a user operating an input unit, wherein:

the machining order acquisition step acquires the order in which the machining paths should be machined, from the machining paths read in the machining shape reading step; and the program generating step generates the numerical control program, based on the machining paths read in the machining shape reading step, so as to machine the machining paths in the changed order.

7. The program generating method according to claim 5, further comprising a program reading step of reading a numerical control program; wherein:

the machining order acquisition step acquires the order in which the machining paths should be machined, from the numerical control program read in the program reading step; and the program generating step changes the numerical control program read in the program reading step, so as to machine the machining paths in the changed order.

8. The program generating method according to claim 5, wherein performing the uncut process for leaving part of the core uncut includes a partial cutting of another core from the workpiece such that the another core remains attached to the remaining portion of the workpiece via an uncut portion of the another core.

* * * * *